United States Patent [19]

Benit

[11] Patent Number: 4,582,459

[45] Date of Patent: Apr. 15, 1986

[54] MILLING DEVICE FOR A ROD HANDLE

[75] Inventor: Brad J. Benit, Spirit Lake, Iowa

[73] Assignee: Berkley and Company, Inc., Spirit Lake, Iowa

[21] Appl. No.: 696,893

[22] Filed: Jan. 31, 1985

Related U.S. Application Data

[62] Division of Ser. No. 484,727, Apr. 13, 1983, abandoned.

[51] Int. Cl.⁴ .............................................. B23C 1/16
[52] U.S. Cl. .................................. 409/110; 51/100 R
[58] Field of Search ............... 29/56.5, 33 A; 409/125, 409/126, 110, 97, 124, 130, 180; 51/100 R

[56] References Cited

U.S. PATENT DOCUMENTS

| | | | |
|---|---|---|---|
| 441,126 | 11/1890 | Boone | 43/22 |
| 834,555 | 10/1906 | Bartlett | 43/22 |
| 2,145,612 | 1/1939 | Scogland et al. | 43/23 |
| 2,180,323 | 11/1939 | Maxwell | 43/23 |
| 2,597,738 | 5/1952 | Koos | 43/23 |
| 2,667,713 | 2/1954 | Stephens | 43/23 |
| 2,696,857 | 12/1954 | Groehnebl | 51/100 R X |
| 2,958,131 | 11/1960 | Keene | 409/130 |
| 3,541,922 | 11/1970 | Scott | 409/110 |
| 4,059,925 | 11/1977 | Allen | 51/100 R |
| 4,403,439 | 9/1983 | Wallace | 43/23 |
| 4,417,835 | 11/1983 | Lund | 409/180 |

FOREIGN PATENT DOCUMENTS 767939   2/1940   Fed. Rep. of Germany ...... 409/130

Primary Examiner—William R. Briggs
Attorney, Agent, or Firm—Faegre & Benson

[57] ABSTRACT

A bait casting rod and handle and a method for manufacturing a bait casting handle, wherein the handle includes a grip or butt portion milled in one pass from a block of EVA material having a rod blank butt receiving lumen extending substantially the full length of the handle.

1 Claim, 9 Drawing Figures

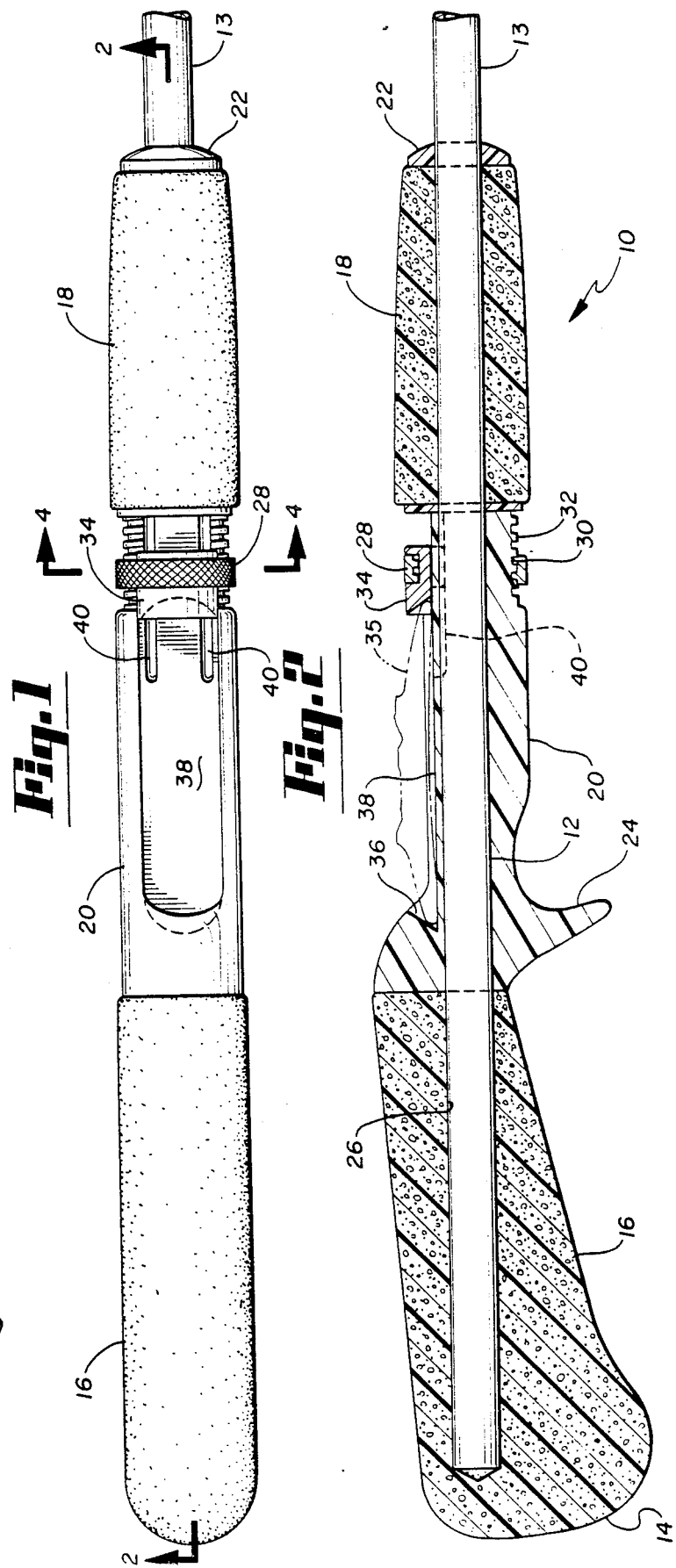
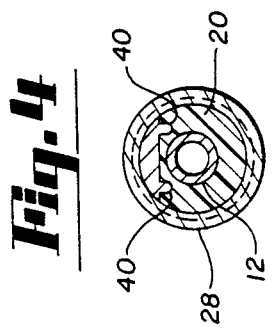
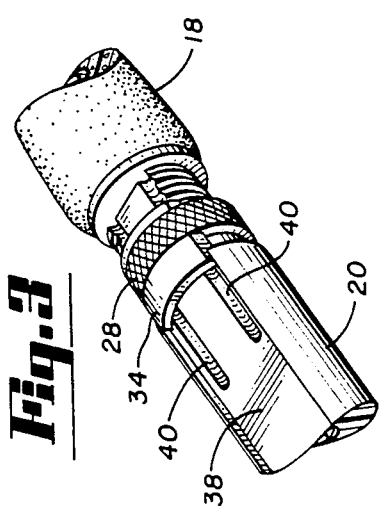

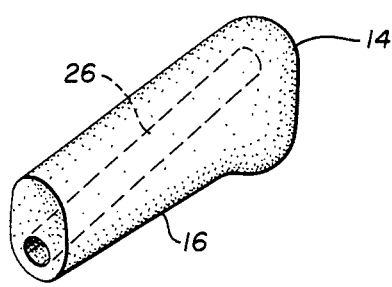
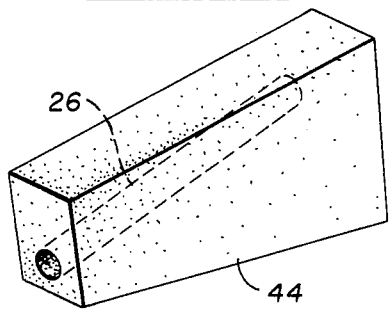
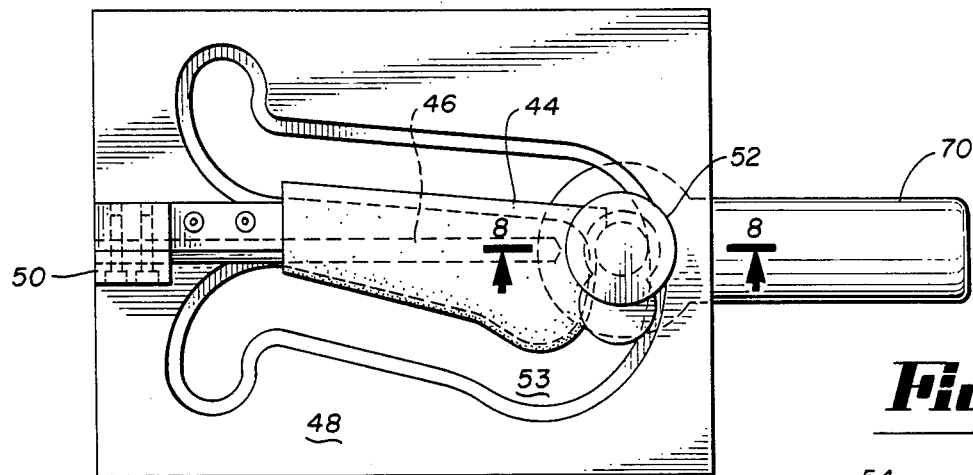
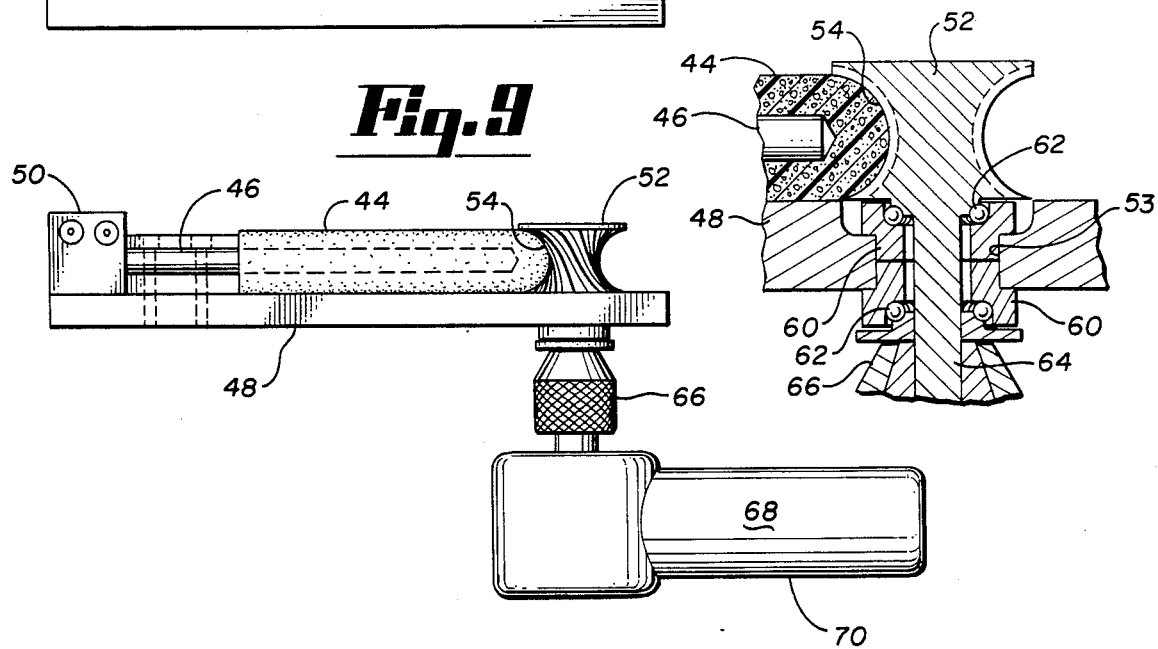

MILLING DEVICE FOR A ROD HANDLE

REFERENCE TO CO-PENDING APPLICATION

This application is a division of pending application Ser. No. 06/484,727 filed Apr. 13, 1983, abandoned as of the filing date of the present application.

BACKGROUND OF THE INVENTION

The present invention relates to fishing rods and, in particular, casting rods.

There exist numerous bait casting rods and handles, including many forms of pistol grip handle. All bait casting handles include a receptacle for receiving the butt end of the rod blank. In the vast majority of prior art fishing rods, the rod blank extends only partially into the handle portion and does not project into the handle portion beyond the area where the fishing reel is mounted. In most cases, the prior art rods utilize a reel seat which includes screw operated clamping means for positioning a locking plate to secure the reel foot to the reel seat portion of the handle. Because the shaft of the adjustment screw passes through the handle material and thereby weakens it, the handle structure must be made stronger by making it thicker and therefore heavier. Because of the fact that the adjustment screw passes through the axis of the reel seat portion of the handle, the rod blank receptacle does not extend through the reel seat portion of the prior art handles.

SUMMARY OF THE INVENTION

The casting rod pistol grip handle, according to the present invention, overcomes the difficulties of prior art pistol grip handles by providing a handle in which the butt end of the fishing rod extends completely through the pistol grip to provide a handle having strength in excess of the rod blank throughout its entire length with no weak points as can occur in prior art structures. The combination of the handle having the rod blank extending completely through the pistol grip and the adjustable means for securing the reel to the reel seat provide an overall handle having strength characteristics exceeding those of the rod blank itself with no weak spots which would have a tendency to result in failure of the handle. The improved structure permits the handle grip portion to be manufactured from extremely lightweight materials because the rod butt portion provides all of the necessary mechanical strength. A method for making the grip portion of the handle is shown.

BRIEF DESCRIPTION OF THE DRAWINGS

FIG. 1 is a top plan view of the butt end of a fishing rod according to the present invention;

FIG. 2 is a side elevational cut-away view of the handle shown in FIG. 1 taken along the lines 2—2.

FIG. 3 is a fragmentary perspective view showing the operation of the adjustment ring for securing the reel to the reel seat.

FIG. 4 is a cross-section taken along the lines 4—4 of FIG. 1;

FIG. 5 is a view of the grip portion of the handle showing, in phantom outline, the rod blank receiving lumen or receptacle.

FIG. 6 is a perspective view showing a blank for the pistol grip handle prior to machining.

FIG. 7 is a top plan view of apparatus used to form the handle of FIG. 5 from the blank of FIG. 6.

FIG. 8 is an enlarged fragmentary sectional view of a portion of FIG. 7 taken along the lines 8—8.

FIG. 9 is an elevational view of the apparatus of FIG. 7.

DETAILED DESCRIPTION OF THE PREFERRED EMBODIMENTS

As shown in FIGS. 1 and 2, the pistol grip bait casting rod handle assembly 10 is shown attached to the butt portion 12 of a bait casting rod blank 13. As can be seen most clearly in FIG. 2, the butt portion 12 is inserted throughout substantially the entire length of the handle assembly 10 and projects to almost the butt end 14 of handle or grip portion 16.

The handle assembly 10 is comprised of a foregrip 18, a reel seat portion 20 and the handle or butt grip 16. If desired, a ferrule 22 can be mounted on the rod end of foregrip 18.

Reel seat 20b externally resembles the reel seat portions of prior art bait casting rods as to its general shape, including the finger rest 24 which gives the handle assembly its characteristic pistol grip effect. The reel seat portion differs from the prior art in that it has a rod receptacle or lumen 26 passing through its entire length. In prior art bait casting pistol grips, the butt end of the rod projects only into the foregrip portion of the handle assembly and the handle or grip is cast in a single piece with the reel seat and foregrip, resulting in a fairly heavy structure.

In the preferred embodiment of the pistol grip bait casting handle, FIG. 3 shows the reel seat ring 28 which is threaded to move axially along the reel seat 20 by the cooperative action of its internal threads 30 and the threading 32 on the reel seat portion 20 itself. The rotatable ring 30 carries with it a hold-down member 34 which is advanced toward the butt portion 14 of the handle by the action of the reel seat ring 28 as it is rotated to secure the reel foot under the hold-down member or hood 34, while the other end of the reel foot is secured in the rear notch 36. The reel foot 35 is shown in FIG. 2 only in fragmentary phantom outline.

The use of the adjustable ring 28, which circumferentially surrounds the reel foot portion rather than projecting through it, avoids weakening the reel seat or foregrip portions of the handle assembly 10 with a screw projecting therethrough to raise and lower a reel foot hold-down element of the type typically used in prior art pistol grip bait casting handle assemblies. The use of a reel hold-down device, such as shown in FIGS. 2 and 3, allows the reel seat portion to have a receptacle or lumen drilled axially through its length without compromising the strength of the handle assembly. It is clear that no purpose is served by having a handle grip assembly which is stronger than the rod blank which is installed in it.

In order to facilitate the movement of the hold-down member or hood piece 34 along the planar mounting surface 38 of reel seat portion 20, a pair of slots 40 are milled into surface 38 to support both edges of the hold-down member 34 to keep it from rotating with the rotatable ring 28. Because hold-down member 34 has an inside radius corresponding generally to that of the knurled adjusting ring 28, there is room between it and the planer surface 38 to receive the front edge of the reel foot.

In prior art molded pistol grip bait casting handles, the butt or handle portion 16 is molded from a fairly heavy plastic portion which is, in turn, bonded to or molded in one piece with reel seat portion 20. In the present device, the added strength provided by the fact that the butt end of the rod blank 12 projects throughout substantially the entire pistol grip handle assembly to substantially the butt end of the handle or butt portion 16 allows the use of a much lighter and therefore more desirable material for the handle portion. In the preferred embodiment shown, the material utilized is an elastomer, such as Ethylene Vinylacetate or polyethylene manufactured by E. I. DuPont under the commercial designation EVA. That material, which is produced in slab form, can readily be machined into the individual handle porton 16 utilizing the apparatus shown in FIGS. 7 through 9.

FIG. 5 shows the handle portion 16 which has a rod receiving lumen or receptacle 26 projecting substantially through its entire length to butt portion 14. Before the machining operation is performed on the material from which handle 16 is formed, the unfinished handle blank has an appearance such as shown in FIG. 6. The blanks are cut from a single slab. In order to minimize machining, each blank is cut along the diagonal chords of the finished handle. The receptacle or lumen 26 is then drilled into the block slanted upwardly as shown in FIG. 6 to ultimately produce a handle grip portion 16 having the desired angle to the reel seat portion.

Handle blank 44 is then mounted on a mandrel 46 which is supported parallel to the surface of a base plate 48 by a spindle fixture or mandrel support 50. A cutter 52 is then moved along a guide slot 54 on the fixture plate 48. The guide slot 54 follows the contour of the desired finished handle 16 and provides a track for moving the cutter 52 which simultaneously forms the edge radius 54 and the outer contour of the finished handle 16. The cutter is, in the preferred embodiment shown, a 60-grit grinding wheel rotated at 3600 rpm having a minimum diameter of one and one-half inches, a maximum diameter of two and one-half inches and a transition between the minimum and maximum diameters which itself has a one-half inch radius. Thus, the grinding wheel forms a one-half inch radius arcuate edge contour around the top butt and bottom edges of the handle while it shapes the blank into the desired handle contour.

In order to facilitate the movement of the cutter 54 around the circumference of the blank 44, guide slot 53 receives a guide follower 60 which slides along the guide slot to trace the contour. On the inner surface of follower 60, there are a plurality of bearings 62 which rotatably support cutter 52 and the shaft 64 which depends from it. The end of shaft 64 is mounted in a chuck 66 which is, in turn, driven by a motor 68. As shown in FIG. 9, the motor 68 has a handle 70 projecting from it which serves as a convenient means for moving the motor chuck and cutter along guide slot 53 to form a finished handle 16 from a blank 44.

Although the present invention has been described with reference to preferred embodiments, workers skilled in the art will recognize that changes may be made in form and detail without departing from the spirit and scope of the invention as defined in the appended claims:

What is claimed is:

1. A machine for manufacturing a bait casting reel handle from a rectangular blank of resilient material, said blank having top and bottom surfaces corresponding to the sides of the handle and having sides corresponding to the top, butt and bottom edges of the grip, said blank having a lumen extending into it from a further side, said machine comprising, in combination:
   (a) a base plate;
   (b) mandrel means;
   (c) means for supporting said mandrel means parallel to said base plate, said mandrel means constructed and arranged for insertion into the lumen of said blank and supporting said blank with its bottom surface in contact with said base plate;
   (d) milling means for forming an arcuate edge contour on the edges of said blank; and
   (e) guide track means mounted on said base plate for receiving and carrying said milling means and guiding said milling means along a path for forming a rod handle having a contour determined by said guide means and having an edge contour determined by said milling means.

* * * * *